United States Patent
Para et al.

(10) Patent No.: US 11,446,853 B2
(45) Date of Patent: Sep. 20, 2022

(54) TIRE WITH VARIABLE RIBBON SIZE TREAD AND SYSTEM AND METHOD FOR MAKING SAME

(71) Applicant: Bridgestone Americas Tire Operations, LLC, Nashville, TN (US)

(72) Inventors: Jason J. Para, Franklin, TN (US); Zachary G. Lorenz, Nashville, TN (US)

(73) Assignee: Bridgestone Americas Tire Operations, LLC, Nashville, TN (US)

( * ) Notice: Subject to any disclaimer, the term of this patent is extended or adjusted under 35 U.S.C. 154(b) by 460 days.

(21) Appl. No.: 16/344,167

(22) PCT Filed: Nov. 6, 2017

(86) PCT No.: PCT/US2017/060210
§ 371 (c)(1),
(2) Date: Apr. 23, 2019

(87) PCT Pub. No.: WO2018/089307
PCT Pub. Date: May 17, 2018

(65) Prior Publication Data
US 2019/0329474 A1    Oct. 31, 2019

Related U.S. Application Data

(60) Provisional application No. 62/420,346, filed on Nov. 10, 2016.

(51) Int. Cl.
*B29C 48/07* (2019.01)
*B29C 48/35* (2019.01)
(Continued)

(52) U.S. Cl.
CPC ............. *B29C 48/07* (2019.02); *B29C 48/002* (2019.02); *B29C 48/35* (2019.02); *B29C 48/92* (2019.02);
(Continued)

(58) Field of Classification Search
CPC ......... B29C 48/07; B29C 48/35; B29C 48/92; B29C 48/002; B29D 30/3028; B29D 30/60
See application file for complete search history.

(56) References Cited

U.S. PATENT DOCUMENTS

| 1,335,879 A | 4/1920 | Darrow |
| 2,259,162 A | 10/1941 | Hirsch et al. |

(Continued)

FOREIGN PATENT DOCUMENTS

| EP | 1201414 | 5/2002 |
| EP | 1815971 | 8/2007 |

(Continued)

OTHER PUBLICATIONS

European Search Report and Opinion; corresponding European Patent Application No. 17869779; dated May 7, 2020.

*Primary Examiner* — Joseph S Del Sole
*Assistant Examiner* — John Robitaille

(57) ABSTRACT

A method of manufacturing a tire tread includes extruding a rubber strip and conveying the rubber strip through an opening of a roller die. The opening is defined by an upper die and a lower die, wherein the upper die and lower die contact the rubber strip and define a cross-section of the rubber strip as the rubber strip is conveyed through the opening. The method also includes adjusting a distance between the upper die and the lower die as the rubber strip is conveyed through the opening. The method further includes applying the rubber strip from the roller die onto a (Continued)

receptacle that rotates about a receptacle axis. The method also includes translating the roller die in a first direction parallel to the receptacle axis while applying the rubber strip, thereby forming a spiral of the rubber strip about the receptacle.

12 Claims, 8 Drawing Sheets

(51) Int. Cl.
　　*B29D 30/30*　　　(2006.01)
　　*B29C 48/92*　　　(2019.01)
　　*B29C 48/00*　　　(2019.01)
　　*B29D 30/60*　　　(2006.01)

(52) U.S. Cl.
　　CPC ......... *B29D 30/3028* (2013.01); *B29D 30/60* (2013.01); *B29C 2948/92019* (2019.02); *B29C 2948/92095* (2019.02)

(56) References Cited

U.S. PATENT DOCUMENTS

| | | | |
|---|---|---|---|
| 2,610,532 A * | 9/1952 | Heppenstall | B21H 1/06 72/111 |
| 2,614,952 A | 10/1952 | Kraft | |
| 3,268,380 A | 8/1966 | Guichon et al. | |
| 3,308,000 A | 3/1967 | Holman | |
| 3,523,854 A | 8/1970 | Cantarutti | |
| 3,580,781 A | 5/1971 | Hoffer | |
| 3,599,288 A * | 8/1971 | Eakman | B29C 43/245 425/141 |
| 3,607,497 A | 9/1971 | Chrobak | |
| 3,674,584 A | 7/1972 | Klein | |
| 2002/0074077 A1 * | 6/2002 | Ikeda | B60C 13/04 156/123 |
| 2009/0095390 A1 | 4/2009 | Frerichs | |
| 2009/0188607 A1 * | 7/2009 | Tatara | B29D 30/24 156/117 |

FOREIGN PATENT DOCUMENTS

| | | |
|---|---|---|
| EP | 2301738 | 3/2011 |
| WO | 2007088455 | 8/2007 |

* cited by examiner

TIRE WITH VARIABLE RIBBON SIZE TREAD AND SYSTEM AND METHOD FOR MAKING SAME

FIELD OF INVENTION

This disclosure relates to the field of tire constructions. More particularly, the disclosure relates to tires with features such as lugs, bars, ribs, or tread blocks, and methods of making tires with these features. Further, the disclosure also relates to agricultural and off road tires and methods of making agricultural and off road tires.

BACKGROUND

Known tire manufacturing methods involve building a green tire, including a green tread, and vulcanizing the green tire and tread in a mold. The tread may be built by a ribbon treading process, in which a ribbon of green rubber is continuously applied in a spiral manner to a drum. When a green tire is placed in a mold, the volume between the green tire and the mold features must be filled with rubber. Thus, viscous rubber flows into the volume between the green tire and the mold features. The viscous rubber and green tire are cured during vulcanization.

SUMMARY OF THE INVENTION

In one embodiment, a system for making a tire tread includes an extruder, a lower roller die, and an upper roller die spaced from the lower roller die, thereby forming an opening. The system further includes an adjustment apparatus configured to move the upper roller die relative to the lower roller die, thereby adjusting the size of the opening. The system also has a conveyor having a first end proximate to the extruder and a second end proximate to the upper and lower roller dies, such that the conveyor receives a strip of green rubber extruded by the extruder and feeds the strip of green rubber to the opening between the upper and lower roller dies. The system further includes a drum proximate to the upper and lower roller dies. The upper and lower roller dies are configured to apply the strip of green rubber to the drum. The system also has a controller configured to control the adjustment apparatus to move the upper roller die relative to the lower roller die while the conveyor feeds the strip of green rubber to the upper and lower roller dies, thereby changing a thickness of the strip of green rubber as it is applied to the drum.

In another embodiment, a method of manufacturing a tire tread includes extruding a rubber strip and conveying the rubber strip through an opening of a roller die. The opening is defined by an upper die and a lower die, wherein the upper die and lower die contact the rubber strip and define a cross-section of the rubber strip as the rubber strip is conveyed through the opening. The method also includes adjusting a distance between the upper die and the lower die as the rubber strip is conveyed through the opening. The method further includes applying the rubber strip from the roller die onto a receptacle that rotates about a receptacle axis. The method also includes translating the roller die in a first direction parallel to the receptacle axis while applying the rubber strip, thereby forming a spiral of the rubber strip about the receptacle.

In yet another embodiment, a green tire tread includes a strip of green rubber having a first edge and a second edge. The strip of green rubber has the same width along its entire length. The strip of green rubber is wound about in a spiral, such that the first edge contacts the second edge. A thickness of the strip of green rubber varies along the strip, such that the strip of green rubber has peaks and valleys. A first peak on a first portion of the strip of green rubber is adjacent a second peak on a second portion of the strip of green rubber that contacts the first portion. A first valley on a third portion of the strip of green rubber is adjacent a second valley on a fourth portion of the strip of green rubber that contacts the third portion.

BRIEF DESCRIPTION OF THE DRAWINGS

In the accompanying drawings, structures are illustrated that, together with the detailed description provided below, describe exemplary embodiments of the claimed invention. Like elements are identified with the same reference numerals. It should be understood that elements shown as a single component may be replaced with multiple components, and elements shown as multiple components may be replaced with a single component. The drawings are not to scale and the proportion of certain elements may be exaggerated for the purpose of illustration.

DETAILED DESCRIPTION

Figure 1A:
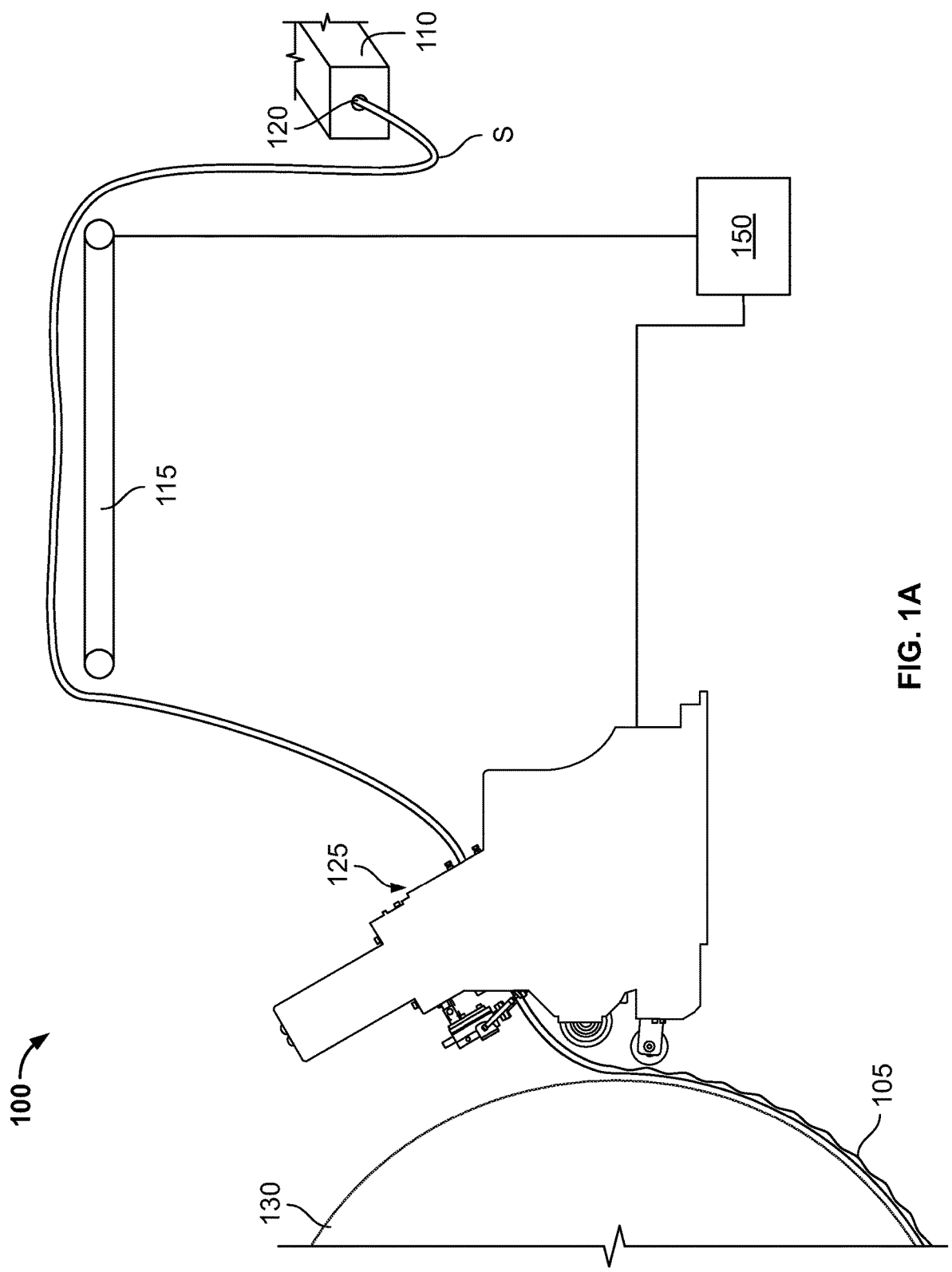
FIG. 1A is a schematic drawing illustrating a side view of one embodiment of a system 100 for making a tire tread.

FIG. 1A is a schematic drawing illustrating a side view of one embodiment of a system 100 for making a green tread 105. The system 100 includes an extruder 110 configured to receive a mixture of green rubber and eject it as a strip S onto a conveyor 115. As one of ordinary skill in the art would understand, green rubber is rubber that has yet to be vulcanized. The system 100 is not limited to processing green rubber, however, and any polymeric material may be employed.

The extruder 110 has an opening 120 that defines the shape of the extruded strip S. Here, the opening 120 is oval-shaped, so the resulting strip S has an ovular cross-section. Such an ovular strip may also be referred to as an ovular ribbon or an oval noodle. In alternative embodiments, the strip may have a circular, rectangular, trapezoidal, triangular, pentagonal, or other geometric or complex cross-section when it is extruded. In other alternative embodiments, the cross-section of the strip may be any geometric shape. The shape of the strip may be defined by a die plate that imparts a shape on the ribbon. Alternatively, the strip may be shaped by rollers as it is extruded.

The conveyor 115 has a first end proximate to the extruder 110 to receive the extruded strip S. The conveyor 115 is made of an inextensible material, such as polyester. Because the extrusion process warms the rubber, the strip S is tacky and sticks well against conveyor 115 without the need for adhesives. In one known embodiment the temperature of the rubber strip S is approximately 200° F. (93° C.) as it exits the extruder 110. However, it should be understood that the rubber may be at any temperature. In an alternative embodiment, at least one side of the conveyor is coated with an adhesive or a resin to obtain proper adhesion to the green rubber strip.

In alternative embodiments (not shown), there may be loop points between the extruder and the conveyor entrance. Likewise, there may be loop points after the conveyor exit. Such loop points may include a series of rollers (not shown) that define a meandering path for the strip S.

The conveyor 115 then feeds the strip of green rubber to a roller die 125, which shapes the strip S and applies it onto a drum 130. In an alternative embodiment (not shown), the strip of green rubber is applied directly to a tire carcass. In other embodiments (not shown), the strip of green rubber may be applied to any type of receptacle.

Figure 1B:
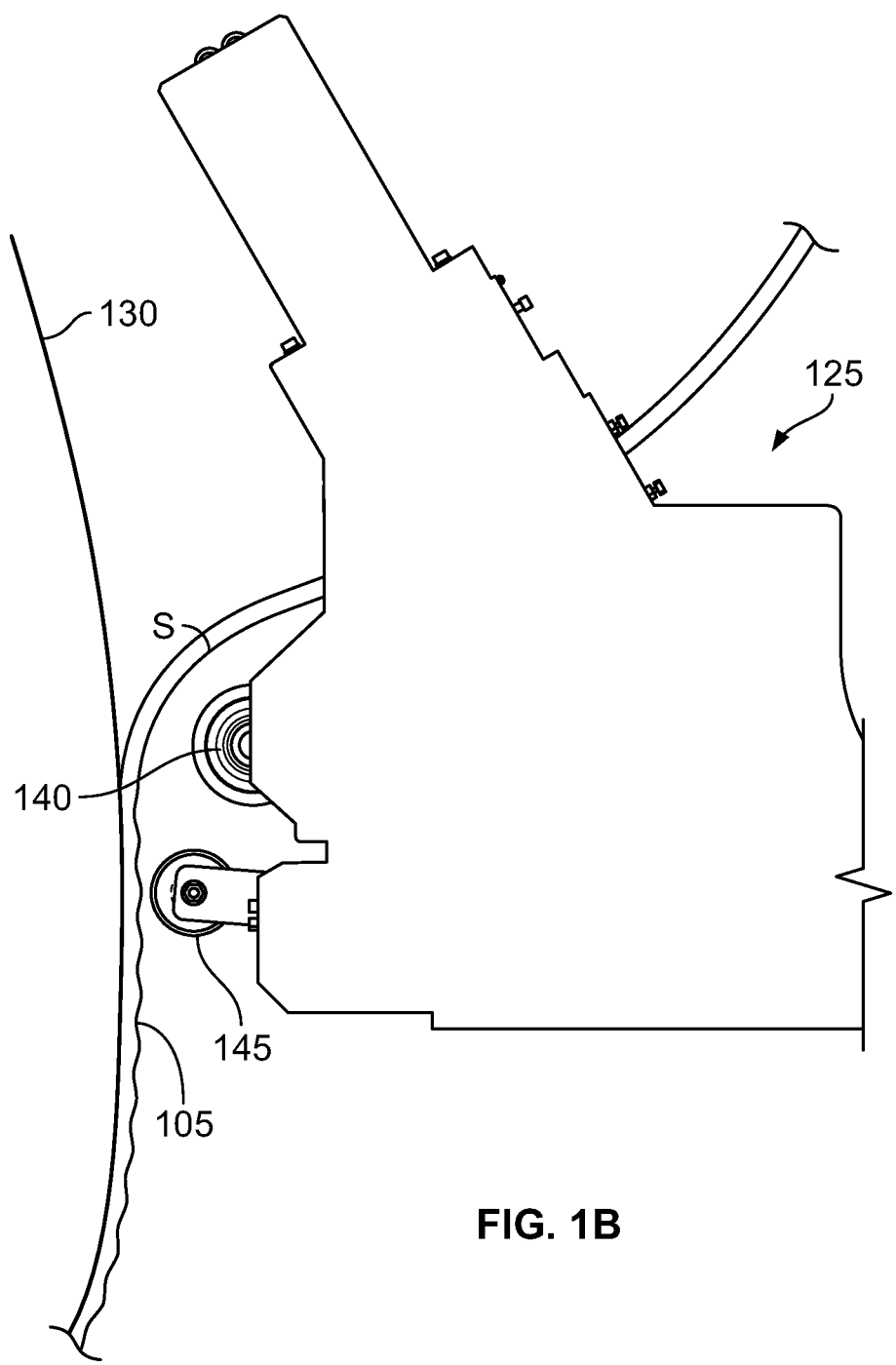
FIG. 1B is schematic drawing of a detail view of a roller die in the system 100 for making a tire tread.

Additional details of the roller die 125 are shown in the detail view of FIG. 1B.

As can be seen in FIG. 1B, the strip S is carried forward by an applicator wheel 140, and the roller die 125 applies the strip S onto the drum 130. In an alternative embodiment (not shown), separating means such as a knife may be employed to cut the strip to complete the treading process.

In the illustrated embodiment, the roller die further includes a stitching wheel 145 for pressing the strip S onto the drum 130. The stitching wheel 145 may be connected to a damper that keeps the stitching wheel 145 in consistent contact with the strip S, such that the resulting tread has no air between layers of the tread strips. The stitching wheel 145 may be coated with a synthetic resin to prevent it from sticking to the strip S. In one embodiment, the stitching wheel 145 is constructed of steel, aluminum, or another metal. In an alternative embodiment, the stitching wheel 145 is constructed of a polymeric material, such as polyurethane. The stitching wheel may include spokes, or it may be a solid wheel. In an alternative embodiment, the stitching wheel may be omitted.

In one embodiment, one or more regulators may be employed to control the amount of pressure exerted by the stitching wheel. For example, electro-pneumatic regulators may be employed. It has been observed that that the stitching wheel should apply varying amounts of pressure during application of the strip to prevent air from becoming trapped beneath the strip. The amount of pressure needed may depend on factors such as the speed of the strip S, the cross-section of the strip S, the axial location along the drum, and the radial location of the strip. For example, if the strip is applied in multiple passes, a first pressure may be used on the first pass, and higher pressures may be used on subsequent passes.

As can be seen in FIGS. 1A and 1B, the applicator wheel 140 has a first axis of rotation and the drum 130 has a second axis of rotation that is substantially parallel to the first axis of rotation. The applicator wheel 140 and the drum 130 rotate in opposite directions, so that the strip is circumferentially wound about the drum 130. For example, in the view shown in FIG. 1B, the drum 130 rotates in a clockwise direction and the applicator wheel 140 rotates in a counter-clockwise direction. In an alternative embodiment, the drum rotates in a counter-clockwise direction and the front roller rotates in a clockwise direction.

The roller die 125 is configured to translate in a first direction parallel to the first axis of rotation while the drum 130 and the applicator wheel 140 each rotate. As a result, the strip S is spiral wound about the drum 130. For example, the roller die 125 may translate along one or more rails that are parallel to the first axis of rotation.

In one embodiment, the applicator wheel 140 is attached to a calender head apparatus, such that the applicator wheel 140 moves in and out from the drum according to the movement of the calender head. In an alternative embodiment, the applicator wheel 140 is attached to a separate cylinder that moves it in and out from the drum.

In one embodiment, the distance between the applicator wheel and the drum may vary during the application of the strip S, to accommodate the changing dimensions of the strip. More specifically, the distance between the applicator wheel and the surface of the drum varies because the gauge of the layers of the strip S between the two varies. In one such embodiment, sensors are employed to track the relative position of the applicator wheel, and small adjustments are made to maintain a desired distance.

In one embodiment, the roller die 125 translates from a first position to a second position, and then stops. The strip may then be cut to complete the formation of the green tread 105. Such an embodiment may be referred to as a "single pass" embodiment. In an alternative embodiment, the roller die 125 translates from a first position to a second position in a first direction, and then translates from the second position to the first position in a second direction opposite the first direction, applying a second layer of the strip over the first layer. Such an embodiment may be referred to as a "multiple pass" embodiment. It should be understood that in multiple pass embodiments, the roller die 125 may perform any number of passes. Additionally, the roller die may perform a partial pass. For example, it may be desirable to form thicker shoulder portions of a tire tread. Therefore, the roller die may apply two layers of rubber in the shoulder regions and only a single layer along the center of the tread.

In another alternative embodiment, multiple roller dies may be employed. In such an embodiment, each roller die may perform a single pass to form a green tread. Alternatively, one or more of the roller dies may perform multiple passes to form multiple layers.

With reference back to FIG. 1A, a controller 150 is in signal communication with the conveyor 115, the roller die 125, and the drum 130. The controller 150 is configured to control the speed of the conveyor 115. The controller 150 is also configured to control the translation of the roller die 125 in a direction parallel to its axis of rotation. The controller 150 is further configured to move the upper roller relative to the lower roller while the conveyor 115 feeds the strip of green rubber S to the upper and lower roller dies, thereby changing a thickness of the strip of green rubber as it is applied to the drum 130. The controller may be a computer, a PLC, or other controller. While a single controller is shown in the illustrated embodiment, it should be understood that any number of controllers may be employed.

In an alternative embodiment, the controller 150 is further configured to control the rotational speed of the roller die 125 (for example, by controlling the rotational speed of the applicator wheel 140) and the rotational speed of the drum 130. In one embodiment, the applicator wheel 140 is controlled by a timing belt driven by the lower roller die. In another embodiment, there is no timing belt and the applicator wheel is driven through contact with the drum. The conveyor 115 may be a passive conveyor. In such an embodiment, the controller 150 would control the speed of the conveyor 115 and the rotational speed of the roller die simultaneously.

The controller 150 may move the upper roller 135a relative to the lower roller 135b by controlling an adjustment apparatus. In one embodiment, the adjustment apparatus is a cam and follower system. In an alternative embodiment, the controller moves the upper roller up and down using a linkage and an electric cylinder. In another alternative embodiment, the controller directly moves the upper roller up and down using an electric cylinder.

Figure 2:
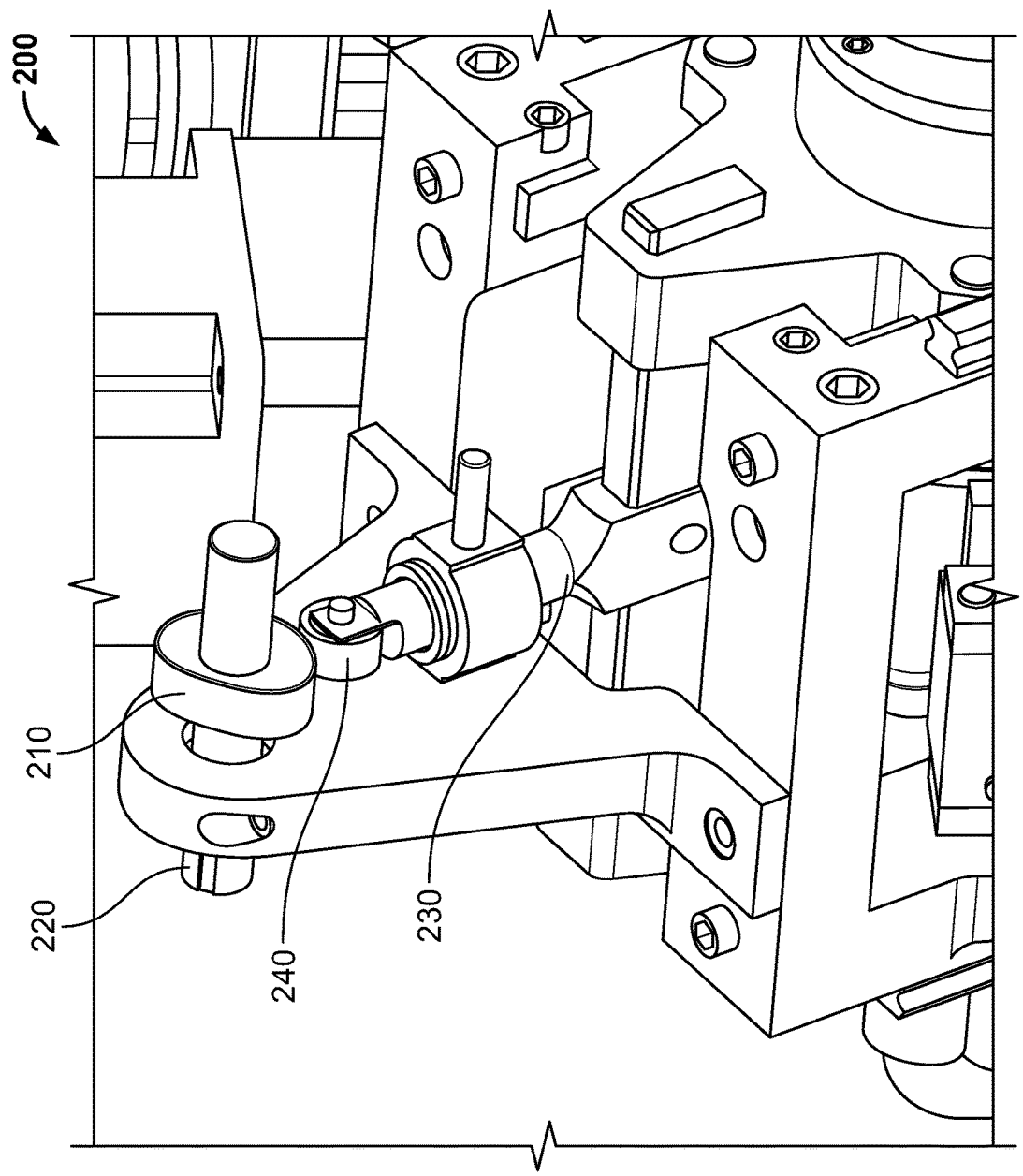
FIG. 2 is a close-up, perspective view of a cam subsystem 200, with components removed.
Figure 3A:
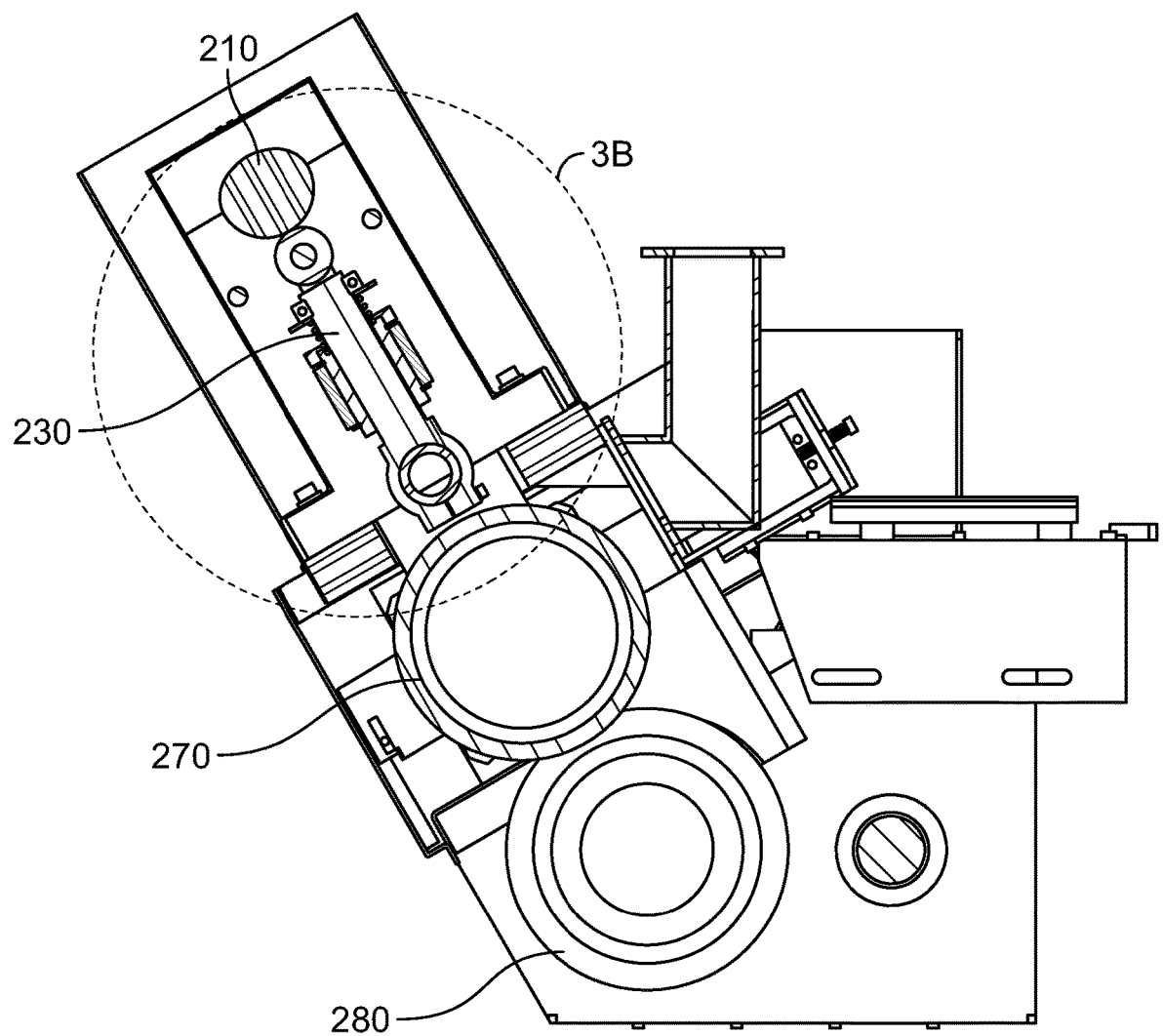
FIG. 3A is a partial cross-section of the cam subsystem 200.
Figure 3B:
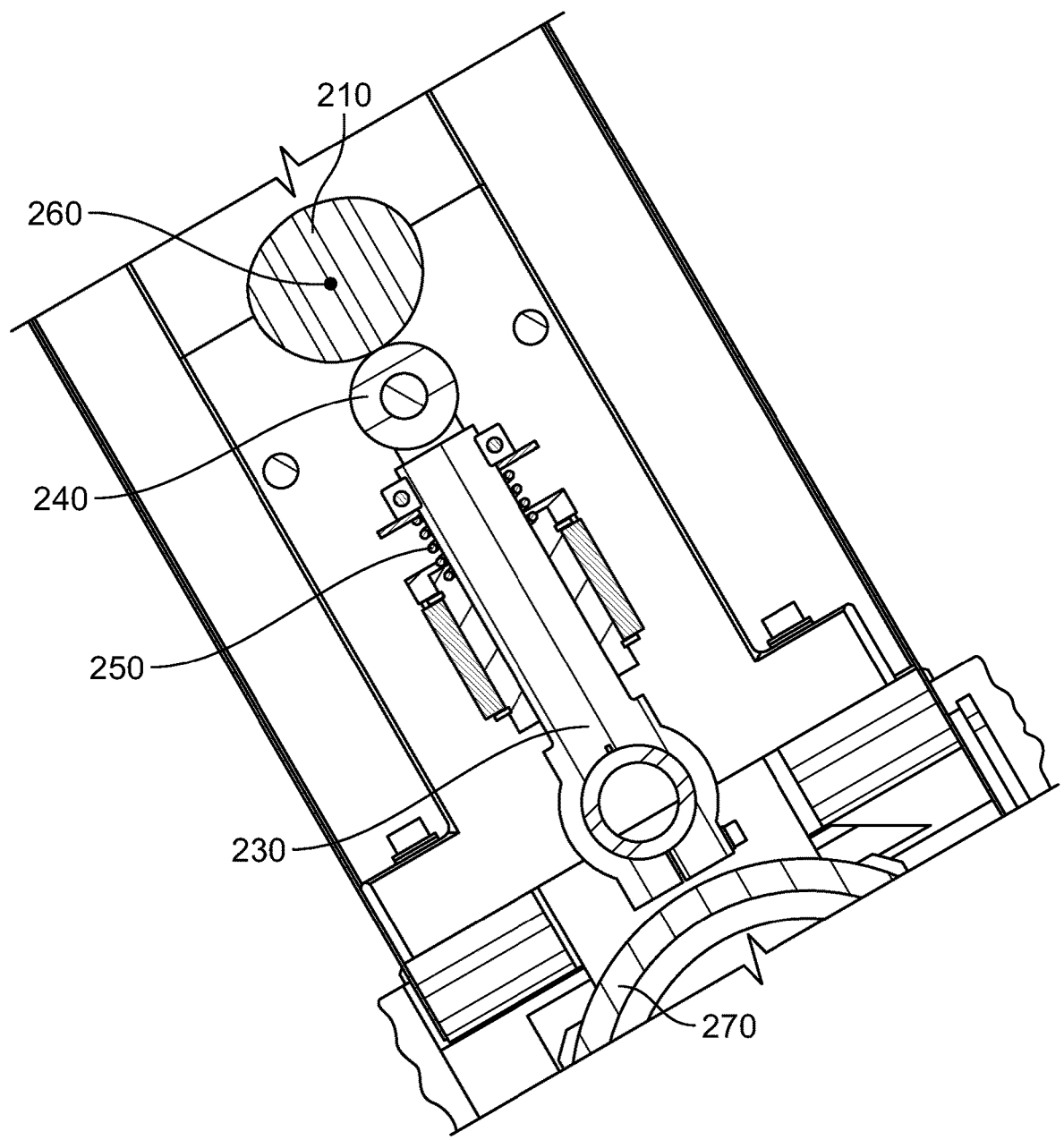
FIG. 3B is a detail view of the cross-section of the cam subsystem 200.

An exemplary cam and follower system is illustrated in FIGS. 2, 3A, and 3B. FIG. 2 is a close-up, perspective view of a cam subsystem 200, with components removed. FIG. 3A is a partial cross-section of the cam subsystem 200, while FIG. 3B is a detail view of the cross-section of the cam subsystem 200.

As shown in FIG. 3A, the roller die 125 includes a pair of shaping rollers, including an upper roller 270 and a lower roller 280. The upper and lower rollers 270, 280 may also be referred to as upper and lower calender rolls, upper and lower dies, or upper and lower roller dies.

The shaping rollers 270, 280 press the ovular strip S into a desired shape. In one embodiment, the strip has a substantially rectangular cross-section with a width between 1.5-3.0 inches (3.8-7.6 cm), and a height between 0.25-0.375 inches (0.60-1.0 cm). However, it should be understood that the strip may have any desirable shape with any desirable dimensions.

Such nested rollers may become damaged during use. To facilitate repair, each of the upper and lower rollers may be constructed of multiple components. Thus, if a component becomes damaged due to misalignment or from debris, the single component can be replaced instead of the entire roller. The use of multiple components also allows different materials and finishes to be employed. In one embodiment, each roller includes a pair of outer rings constructed of a first material and having a first finish, and each roller further includes a central roller surface constructed of a second material and having a second finish. For example, the roller surface may have a hard chrome finish.

The cam subsystem 200 includes a cam 210 disposed on a rotating shaft 220. In the illustrated embodiment, the cam is an eccentric wheel. In an alternative embodiment, the cam may be a cylinder with an irregular shape. The cam 210 engages a follower 230 as it rotates. In the illustrated embodiment, the follower 230 includes a roller 240 that contacts the cam 210. In alternative embodiments, the roller may be omitted. In such an embodiment, the follower may simply be a shaft. In any embodiment, the cam or the follower may be lubricated, or constructed of low friction materials.

The follower 230 is biased towards the cam 210 by a spring 250, so that the roller 240 maintains contact with the cam 210. Thus, as the cam 210 rotates, the biasing force of the spring 250 and the eccentric shape of the cam 210 will cause the follower 230 to translate towards or away from the cam's axis of rotation 260. In alternative embodiments (not shown), other biasing mechanisms may be employed.

An opposite end of the follower 230 is connected to the upper roller 270 that is spaced from the lower roller 280. In the illustrated embodiment, the lower roller 280 does not translate up and down or side to side. Therefore, when the follower 230 moves towards the cam's axis of rotation 260, the upper roller 270 likewise moves towards the cam's axis of rotation 260, thereby increasing a height of an opening between the upper roller 270 and the lower roller 280. Similarly, when the follower is pushed away from the cam's axis of rotation 260, the upper roller 270 moves away from the cam's axis of rotation 260, thereby decreasing the height of the opening between the upper roller 270 and the lower roller 280. In an alternative embodiment (not shown), the follower is attached to the lower roller and the upper roller is stationary. In another alternative embodiment (not shown), both the upper and lower rollers are connected to followers and both are configured to translate.

Figure 4D:
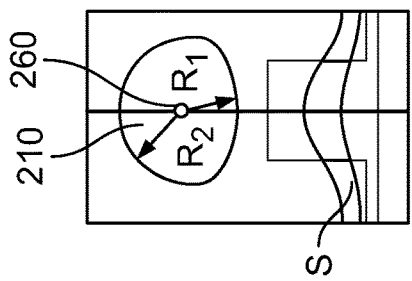
FIGS. 4A-4D are schematic drawings of one embodiment of a cam in various orientations and the resulting rubber strip.
Figure 4C:
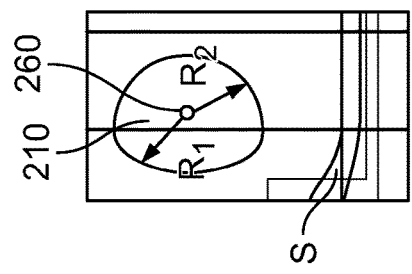

Because the opening between the upper roller 270 and lower roller 280 defines the thickness of the resulting rubber strips, the changing orientation of the cam 210 will cause the thickness of the rubber strip S to change as it passes through the cam subsystem 200. This is illustrated schematically in FIGS. 4A-4D and FIGS. 5A-5D. In the illustrated embodiment, the cam 210 has a first radius $R_1$ and a second radius $R_2$ that is greater than the first radius $R_1$. In FIG. 4A, the cam 210 is in a first position, such that it engages the follower (not shown) at a surface having the first radius $R_1$, which is a minimum radius. As a result, the follower is biased towards the cam's axis of rotation 260. As shown in FIG. 5A, when the cam 210 is in this first position, the opening between the upper roller 270 and the lower roller 280 has a maximum height. As a result, the rubber strip S has a maximum thickness, as shown in FIG. 4A.

Figure 4B:
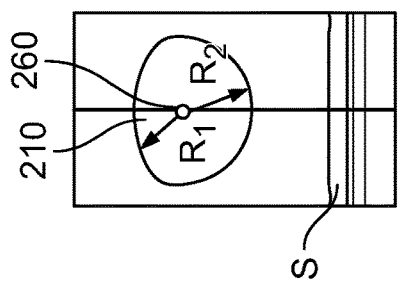
Figure 4A:
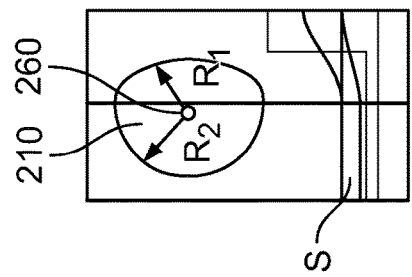
Figure 5D:
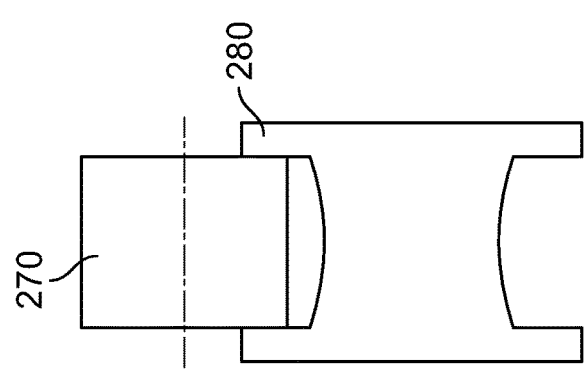
FIGS. 5A-5D are schematic drawings of a roller die in positions corresponding to the orientation of the cam shown in FIGS. 4A-4D.
Figure 5C:
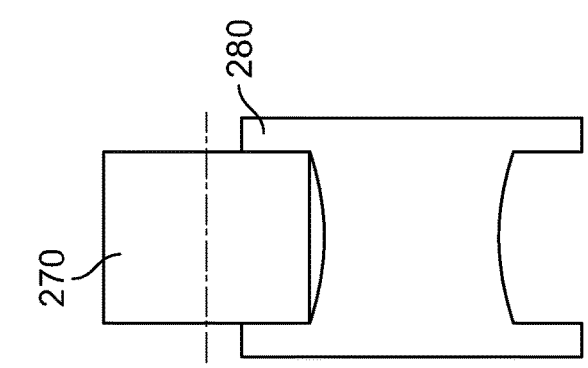
Figure 5B:
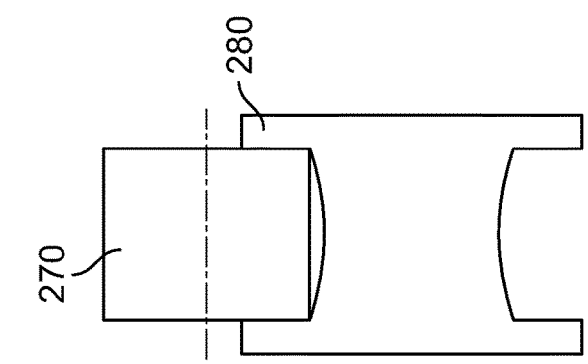
Figure 5A:
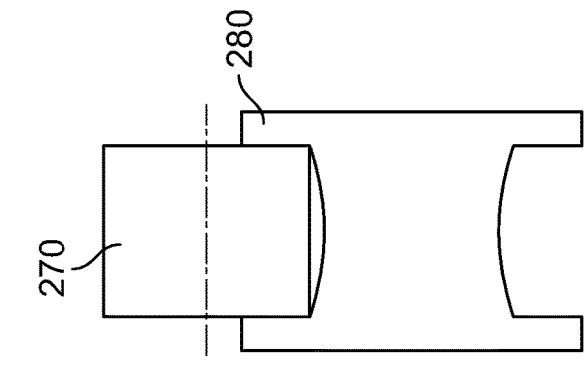

In FIG. 4B, the cam 210 is in a second position, rotated 90 degrees clockwise from the first position. In this second position, the cam 210 engages the follower (not shown) at a surface having the second radius $R_2$, which is a maximum radius. As a result, the follower is biased away from the cam's axis of rotation 260. As shown in FIG. 5B, when the cam 210 is in this second position, the opening between the upper roller 270 and the lower roller 280 has a minimum height. As a result, the rubber strip S has a minimum thickness, as shown in FIG. 4B.

In FIG. 4C, the cam 210 is in a third position, rotated 90 degrees clockwise from the second position. In this third position, the cam 210 still engages the follower (not shown) at a surface having the second radius $R_2$. As a result, the follower remains biased away from the cam's axis of rotation 260. As shown in FIG. 5C, when the cam 210 is in this third position, the opening between the upper roller 270 and the lower roller 280 maintains a minimum height. As a result, the rubber strip S has a minimum thickness, as shown in FIG. 4C.

In FIG. 4D, the cam 210 is in a fourth position, rotated 90 degrees clockwise from the third position. In this fourth position, the cam 210 still engages the follower (not shown) at a surface having the second radius $R_2$. As a result, the follower remains biased away from the cam's axis of rotation 260. As shown in FIG. 5D, when the cam 210 is in this fourth position, the opening between the upper roller 270 and the lower roller 280 maintains a minimum height. As a result, the rubber strip S has a minimum thickness, as shown in FIG. 4D.

As can be seen in FIGS. 5A-5D, the outer sides of a lower portion of the upper roller 270 are in contact with the inner sides of the upper portion of lower roller 280. In other words, the upper and lower rollers are nested within each other, such that their vertical surfaces form a seal that prevents the rubber from leaking out of the die. As one of ordinary skill in the art would understand, a tight clearance would minimize rubber leakage.

In an alternative embodiment (not shown), the contact area may be reduced to reduce drag. For example, one or more of the side surfaces may be angled or flanged. In another alternative embodiment, the contact areas may be constructed of different materials that are selected to reduce drag. In yet another alternative embodiment (not shown), lubricant, bearings, or other drag-reducing means may be employed. It should be understand that the embodiment of FIGS. 5A-5D is merely exemplary and that other sealing means may be employed.

It should be understood that the examples shown in FIGS. 4A-4D and FIGS. 5A-5D are not intended to be limiting. The cam profile may be defined by any number of radii, to produce a strip having any desired profile. It should also be understood that the four positions depicted at 90° intervals are not the only positions that define the motion profile of the upper roller die.

The temperature of the rubber strip S may vary during the course of an application process. It has been found that it is easier to manipulate the rubber strip S at higher temperatures. Therefore, in one embodiment, one or more temperature sensors are employed to measure the temperature of the rubber strip. When the rubber temperature is at a lower range, the system may be operated at a slower speed to allow adequate time to form the rubber into the desired shape. As the temperature rises, the system may be operated at higher speeds.

Figure 6:
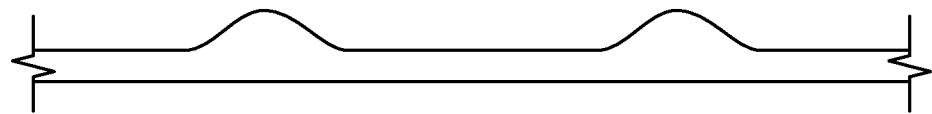
FIG. 6 is a perspective view of a rubber strip produced by the system described herein.

FIG. 6 is a perspective view of an exemplary rubber strip S. In this particular embodiment, the rubber strip S includes both maximum thickness portions and minimum thickness portions. The rubber strip S maintains a constant width along its length.

In one embodiment, the cam 210 is rotated by a servo motor (not shown) that is controlled by the controller 150. In an alternative embodiment, the cam 210 is rotated by a stepper motor (not shown) that is controlled by the controller 150. In another alternative embodiment (not shown), the cam is rotated by a motor and an encoder.

If the cam is rotated at a constant speed, the length of each maximum thickness portion and the length of each minimum thickness portion of the rubber strip will be consistent. The controller may adjust the rotation speed to adjust the length of a maximum thickness portion or a minimum thickness portion of the rubber strip. The controller may also stop rotation of the cam or reverse rotation of the cam to adjust the dimensions of the rubber strip. In an alternative embodiment (not shown), the cam may have three or more radii. Such a cam may be used, for example, to produce a rubber strip that has a minimum thickness portion, an intermediate thickness portion, and a maximum thickness portion.

As one of ordinary skill in the art would understand, the roller die may produce a strip of any desired thickness with any desired pattern of changing thickness by adjusting the rotation or the rotation speed of the cam, or by replacing the cam with a different cam having a different geometry.

Figure 7:
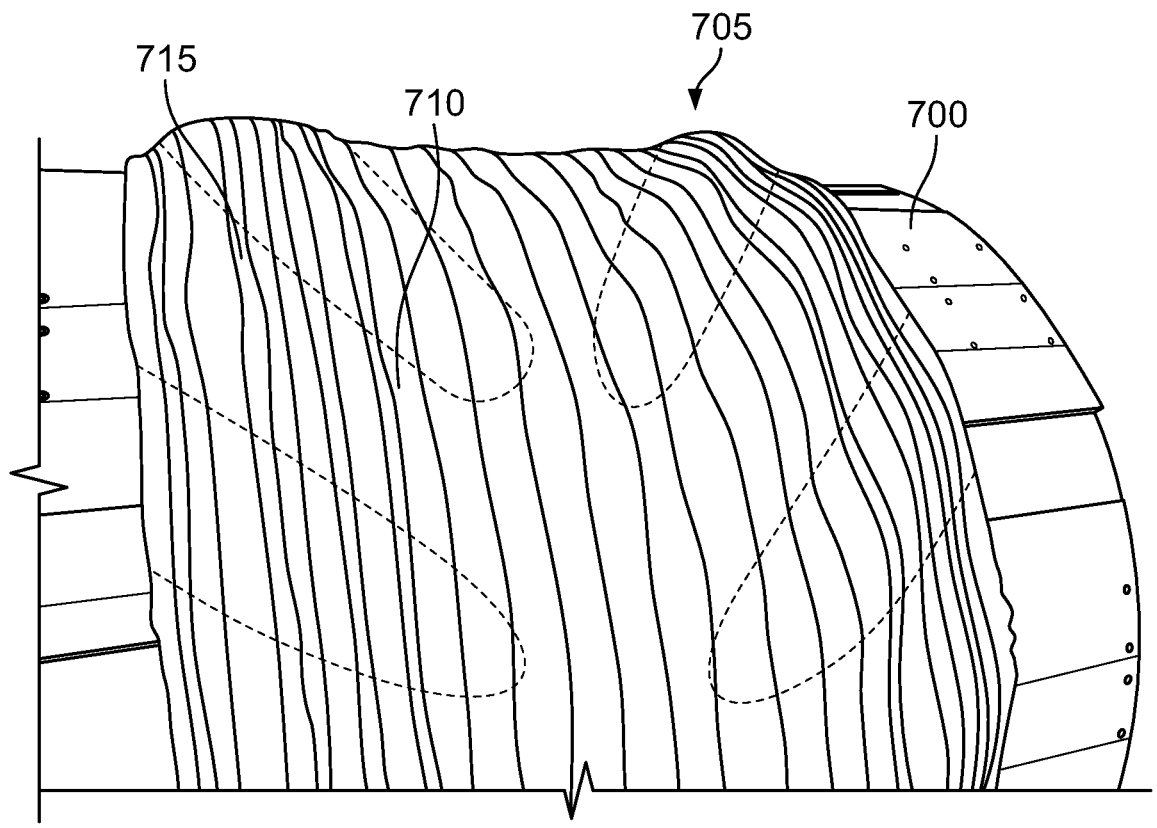
FIG. 7 is a partial perspective view of an exemplary embodiment of a tire tread strip that is spiral wound about a drum such that the tread strip has peaks and valleys.

FIG. 7 illustrates one embodiment of a green ribbon tread. In this embodiment, a drum 700 holds a green ribbon tread 705 having pre-formed peaks 710 and valleys 715. The peaks 710 and valleys 715 are formed by the controller and the cam and follower system adjusting the upper roller die with respect to the lower roller die, as described above. In one embodiment, the rubber strip S is applied to the drum 700 at a rate between 10 kilograms per minute and 35 kilograms per minute. However, it should be understood that any rotational speeds and any feed rate may be employed.

The controller 150 controls the cam and follower system in such a manner that a first peak on a first portion of the green rubber strip S is adjacent a second peak on a second portion of the green rubber strip S that contacts the first portion. Additionally, the controller 150 controls the cam and follower system in such a manner that a first valley on a third portion of the green rubber strip S is adjacent a second valley on a fourth portion of the green rubber strip S that contacts the third portion.

Figure 8:
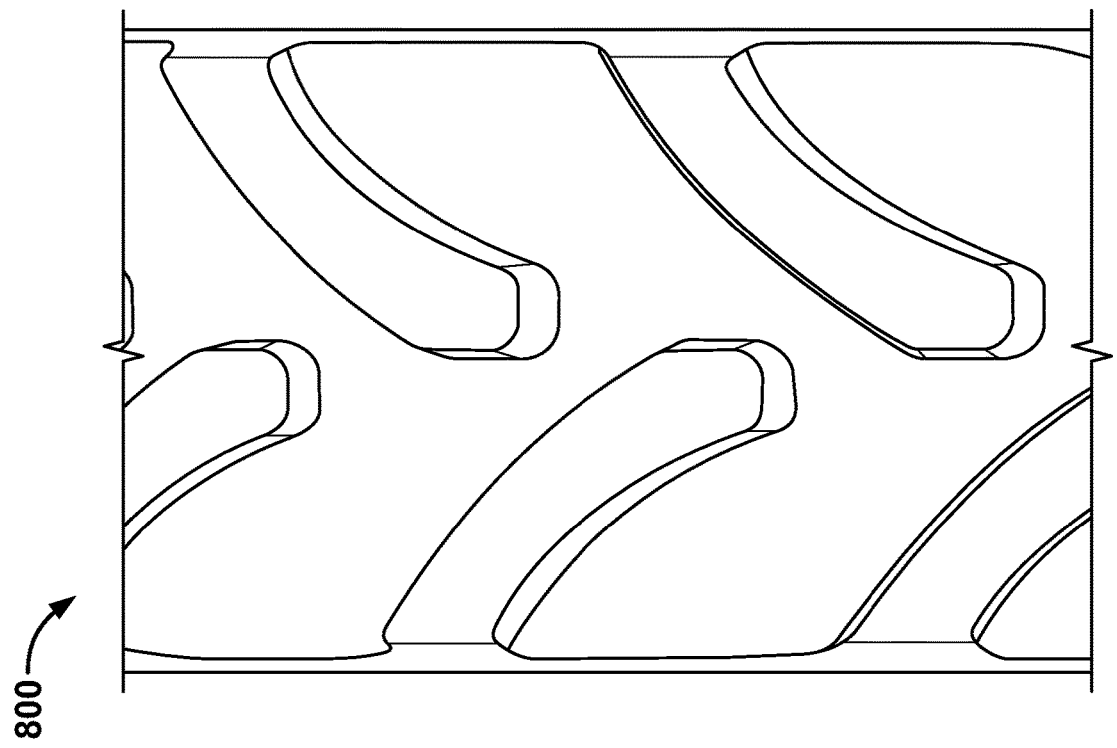
FIG. 8 is a top plan view of an exemplary tread design of a tire.

In one embodiment, the controller 150 controls the cam and follower system so that peaks and valleys are formed that correspond to lug forming portions of a tire mold. For example, FIG. 8 illustrates a top plan view of an exemplary tread design 800 of a tire. The peaks 710 and valleys 715 of the green ribbon tread 705 correspond to the lugs of the tread design 800. As one of ordinary skill in the art would understand, increasing the similarity between peaks 710 and valleys 715 of the green ribbon tread 705 and the mold features will help to reduce rubber flow in the curing press. However, the shape of the green tread elements may depart from the geometry of a cured tread.

In one specific embodiment, the peaks 710 and valleys 715 of the green ribbon tread 705 generally correspond to a tread negative by occupying at least 40% of a cured tire's void and tread element volume. In another embodiment, the peaks 710 and valleys 715 of the green ribbon tread 705 generally correspond to larger voids in a tread. In this embodiment, the peaks 710 and valleys 715 of the green ribbon tread 705 generally correspond to the larger voids in a tread by occupying at least 30% of the cured tire's void volume. In another embodiment, the peaks 710 and valleys 715 of the green ribbon tread 705 closely correspond to the larger voids in a tread by occupying at least 80% of the cured tire's void volume.

In one embodiment, the thickness of the green ribbon tread 705 at a peak 710 is between 50% and 100% greater than the thickness of the green ribbon tread 705 at a valley 715. In one particular embodiment, the thickness of the green ribbon tread 705 at a peak 710 is between 60% and 80% greater than the thickness of the green ribbon tread 705 at a valley 715. In one known example, a thickness of the green ribbon tread 705 at a peak 710 is between 5 centimeters and 20 centimeters, and a thickness of the green ribbon tread 705 at a valley 715 is between 1 centimeter and 5 centimeters. In an alternative embodiment, the thickness of the green ribbon tread at a valley is less than 1 centimeter. In another alternative embodiment, the thickness of the green ribbon tread at a peak is less than 5 centimeters. As one of ordinary skill would understand, increased height of the peaks 710 is desirable for deep mold lugs because it would require less rubber movement during vulcanization. Additionally, using less rubber in the valleys 715 reduces the weight of the tire.

In one particular embodiment, the tread is designed for use on an agricultural tire or off road tire. In this embodiment, the height of each lug is approximately 6% of the tire's width. In additional embodiments, the height of each lug is between 3-8% or 4-7% of the tire's width. In further embodiments, the height of each lug is between 6-35% of the tire's width. However, it should be understood that the lugs may have any height.

As one of ordinary skill in the art would recognize, the tread design may be used in agricultural tire constructions designated as R1, R1W, and R2 constructions, where R1 corresponds to a standard skid depth (Tire & Rim Association Standard AG-09-21), R1W corresponds to a skid depth that is 20% deeper than R1, and R2 corresponds to a skid depth that is 200% of R1. Additional examples of tires utilizing skids include, without limitation, drive wheels for agricultural vehicles, irrigation tires, forestry tires, floatation tires, combine tires, tractor tires, mining tires, construction tires, sprayer tires, and off-the-road vehicles.

In the illustrated embodiment, the drum 700 is a collapsible drum. After the green ribbon tread 705 is completed, the drum 700 is collapsed so that the green ribbon tread 705 can be removed and then placed around a tire carcass (not shown) to form a green tire. The green ribbon tread 705 may be formed at a first location and transported to a second location to be placed on the tire carcass. In an alternative embodiment, the green ribbon tread 705 is cured or partially cured prior to being placed on a tire carcass. In yet another alternative embodiment, the green ribbon tread may be applied directly to the tire carcass.

The tire carcass includes a pair of annular beads configured to secure the tire to a wheel. The tire carcass further includes at least one body ply extending between the annular beads. In one embodiment, the tire carcass also includes a circumferential belt configured to provide structural reinforcement to the tire. Alternatively, a circumferential belt may be omitted from the carcass.

Figure 9:
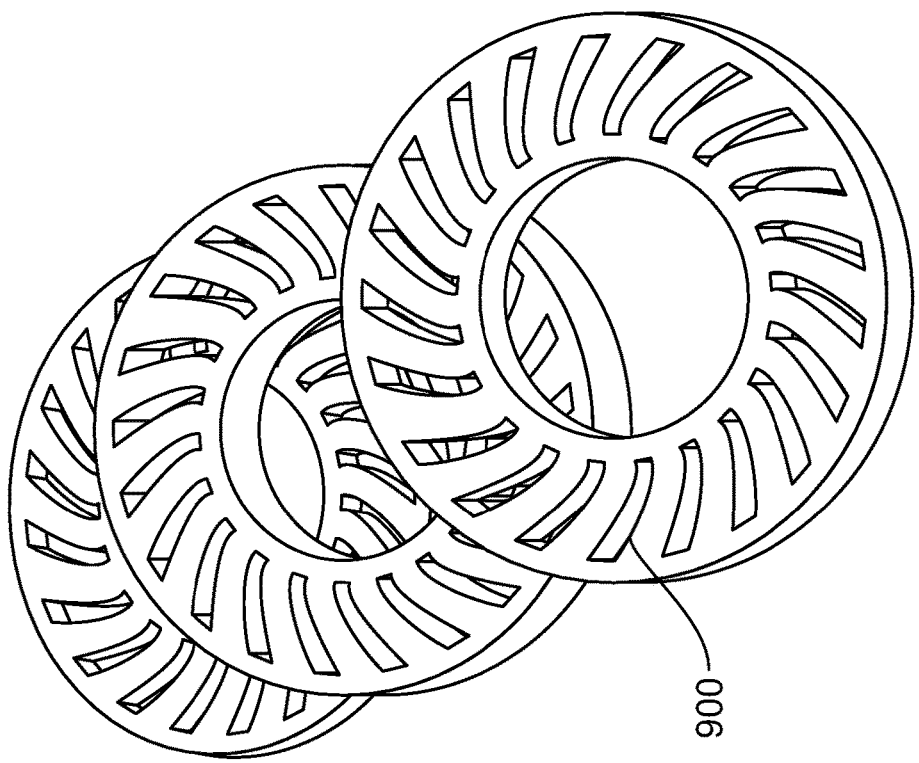
FIG. 9 is a side plan view of a plurality of stitching wheels.

In one particular embodiment, the green ribbon tread 705 is stitched in place on the tire carcass with a stitching roller. FIG. 9 is a side plan view of a plurality of exemplary stitching wheels 900 for stitching the green ribbon tread 705 to a tire carcass. In the illustrated embodiment, the stitching wheel 900 is constructed of polyurethane and includes a plurality of spokes. Such spoked wheels allow the wheel to conform to lugs and valleys that are produced on the green ribbon tread. Alternatively, the stitching roller may have voids corresponding to the peaks 710 of the green ribbon tread 705. In other alternative embodiments, the stitching wheel may be constructed of a metal, such as steel. The stitching wheel may also be solid.

In one embodiment, the stitching wheel 900 is attached to a calender head apparatus, such that the stitching wheel 900 moves in and out from the drum according to the movement of the calender head. In an alternative embodiment, the stitching wheel 900 is attached to a separate cylinder that moves it in and out from the drum.

The green tire is then placed in a vulcanization mold. The vulcanization mold includes a tread forming portion that imparts tread elements onto the tire. For example, the vulcanization mold may include a tread forming portion for an agricultural tire or off road tire that includes voids for forming lugs (or bars) on the tread, and protrusions for forming valleys between the lugs. The green tire is oriented in the vulcanization mold such that the peaks 710 of the green ribbon tread 705 are aligned with voids in the tread forming portion of the mold. During curing of the green tire, rubber flows into voids of the vulcanization mold. However, because of the alignment of the peaks 710 of the green ribbon tread 705, less rubber needs to flow into the voids compared to a smooth green tread.

To assist with the alignment of the green tire in the vulcanization mold, one or more pre-selected locations of the green tread may be marked. The markings on the green tread are then aligned with pre-selected locations of the vulcanization mold. In one embodiment, the vulcanization mold has similar such markings to aid with the alignment. In an alternative embodiment, the vulcanization mold includes an automated system that detects the marking and aligns the green tire in the vulcanization mold.

In one embodiment, the green treads are marked manually. In another embodiment, an automated marking system (not shown) is attached to the ribbon tread applicator. When the ribbon tread applicator is at a pre-selected location (as determined by an encoder, servo, or other indexing system), the automated marking system applies a mark to the green tread. In one known embodiment, the automated marking system includes an ink applicator that applies a simple ink dot to the green tread. A pneumatic arm is pivotally connected to the ink applicator, such that the ink applicator pivots between a capped position and an application position. A sensor confirms that the ink has been applied to the green tread.

As one of ordinary skill in the art will appreciate, the methods and constructions described in this disclosure will increase yield. For instance, reducing the volume between the green tire and the mold features may help improve yield because it reduces rubber flow and resulting gauge variation (such as belt wave) in various reinforcing structures. The methods and constructions described in this disclosure may reduce gauge variation and/or belt wave, particularly in large tires and agricultural tires, where portions of the belt have been known to migrate toward a lug during vulcanization.

Likewise, the methods and constructions described in this disclosure may improve cord distortion and improve tire appearance. The methods and constructions described in this disclosure may also allow for rubber savings. For example, the methods and constructions described herein may require between approximately 10-40% less material and result in a tire having 10-30% less weight.

To the extent that the term "includes" or "including" is used in the specification or the claims, it is intended to be inclusive in a manner similar to the term "comprising" as that term is interpreted when employed as a transitional word in a claim. Furthermore, to the extent that the term "or" is employed (e.g., A or B) it is intended to mean "A or B or both." When the applicants intend to indicate "only A or B but not both" then the term "only A or B but not both" will be employed. Thus, use of the term "or" herein is the inclusive, and not the exclusive use. See, Bryan A. Garner, A Dictionary of Modern Legal Usage 624 (2d. Ed. 1995). Also, to the extent that the terms "in" or "into" are used in the specification or the claims, it is intended to additionally mean "on" or "onto." Furthermore, to the extent the term "connect" is used in the specification or claims, it is intended to mean not only "directly connected to," but also "indirectly connected to" such as connected through another component or components.

While the present disclosure has been illustrated by the description of embodiments thereof, and while the embodiments have been described in considerable detail, it is not the intention of the applicants to restrict or in any way limit the scope of the appended claims to such detail. Additional advantages and modifications will readily appear to those skilled in the art. Therefore, the disclosure, in its broader aspects, is not limited to the specific details, the representative system and method, and illustrative examples shown and described. Accordingly, departures may be made from such details without departing from the spirit or scope of the applicant's general inventive concept.

What is claimed is:

1. A system for making a tire tread comprising:
   an extruder;
   a lower roller die;
   an upper roller die spaced from the lower roller die, thereby forming an opening;
   an adjustment apparatus configured to move the upper roller die relative to the lower roller die, thereby adjusting the size of the opening;
   a conveyor having a first end proximate to the extruder and a second end proximate to the upper and lower roller dies, such that the conveyor receives a strip of green tread rubber extruded by the extruder and feeds the strip of green tread rubber to the opening between the upper and lower roller dies;
a drum having a tire tread carrying portion, the drum being proximate to the upper and lower roller dies, wherein the upper and lower roller dies are configured to apply the strip of green tread rubber to the tread carrying portion of the drum;
a controller configured to control the adjustment apparatus to move the upper roller die relative to the lower roller die while the conveyor feeds the strip of green tread rubber to the upper and lower roller dies, thereby changing a thickness of the strip of green tread rubber as it is applied to the tread carrying portion of the drum; and
a stitching wheel configured to press the strip of green tread rubber after it is applied to the drum, wherein the stitching wheel is constructed of polyurethane and includes a plurality of spokes.

2. The system of claim 1, wherein the controller is a computer, and wherein the thickness of the strip of green tread rubber is changed such that it corresponds to lug forming portions of a tire mold.

3. The system of claim 1, wherein the adjustment apparatus includes a rotating cam that pushes against a member connected to one of the upper roller die and the lower roller die.

4. The system of claim 3, wherein as the cam rotates, it pushes the member from a first position to a second position, wherein the opening between the upper and lower roller dies is at a maximum height when the member is in the first position, and wherein the opening between the upper and lower roller dies is at a minimum height when the member is in the second position.

5. The system of claim 4, wherein the minimum height and maximum height are selected such that a tread formed by the strip has a minimum height between 1 centimeter and 5 centimeters and a maximum height between 5 centimeters and 15 centimeters.

6. The system of claim 1, wherein the controller, the upper and lower roller dies, and the conveyor are configured to apply the strip of green tread rubber to the drum at a rate between 10 kilograms per minute and 35 kilograms per minute.

7. A system for making a tire tread comprising:
an extruder;
a lower roller die;
an upper roller die spaced from the lower roller die, thereby forming an opening;
an adjustment apparatus configured to move the upper roller die relative to the lower roller die, thereby adjusting the size of the opening;
a conveyor having a first end proximate to the extruder and a second end proximate to the upper and lower roller dies, such that the conveyor receives a strip of green rubber extruded by the extruder and feeds the strip of green rubber to the opening between the upper and lower roller dies;
a drum proximate to the upper and lower roller dies, wherein the upper and lower roller dies are configured to apply the strip of green rubber to the drum;
a controller configured to control the adjustment apparatus to move the upper roller die relative to the lower roller die while the conveyor feeds the strip of green rubber to the upper and lower roller dies, thereby changing a thickness of the strip of green rubber as it is applied to the drum; and
a stitching wheel configured to press the strip of green rubber after it is applied to the drum, wherein the stitching wheel is constructed of polyurethane and includes a plurality of spokes.

8. The system of claim 7, wherein the controller is a computer, and wherein the thickness of the strip of green rubber is changed such that it corresponds to lug forming portions of a tire mold.

9. The system of claim 7, wherein the adjustment apparatus includes a rotating cam that pushes against a member connected to one of the upper roller die and the lower roller die.

10. The system of claim 9, wherein as the cam rotates, it pushes the member from a first position to a second position, wherein the opening between the upper and lower roller dies is at a maximum height when the member is in the first position, and wherein the opening between the upper and lower roller dies is at a minimum height when the member is in the second position.

11. The system of claim 10, wherein the minimum height and maximum height are selected such that a tread formed by the strip has a minimum height between 1 centimeter and 5 centimeters and a maximum height between 5 centimeters and 15 centimeters.

12. The system of claim 7, wherein the controller, the upper and lower roller dies, and the conveyor are configured to apply the strip of green rubber to the drum at a rate between 10 kilograms per minute and 35 kilograms per minute.

* * * * *